Figure 1:
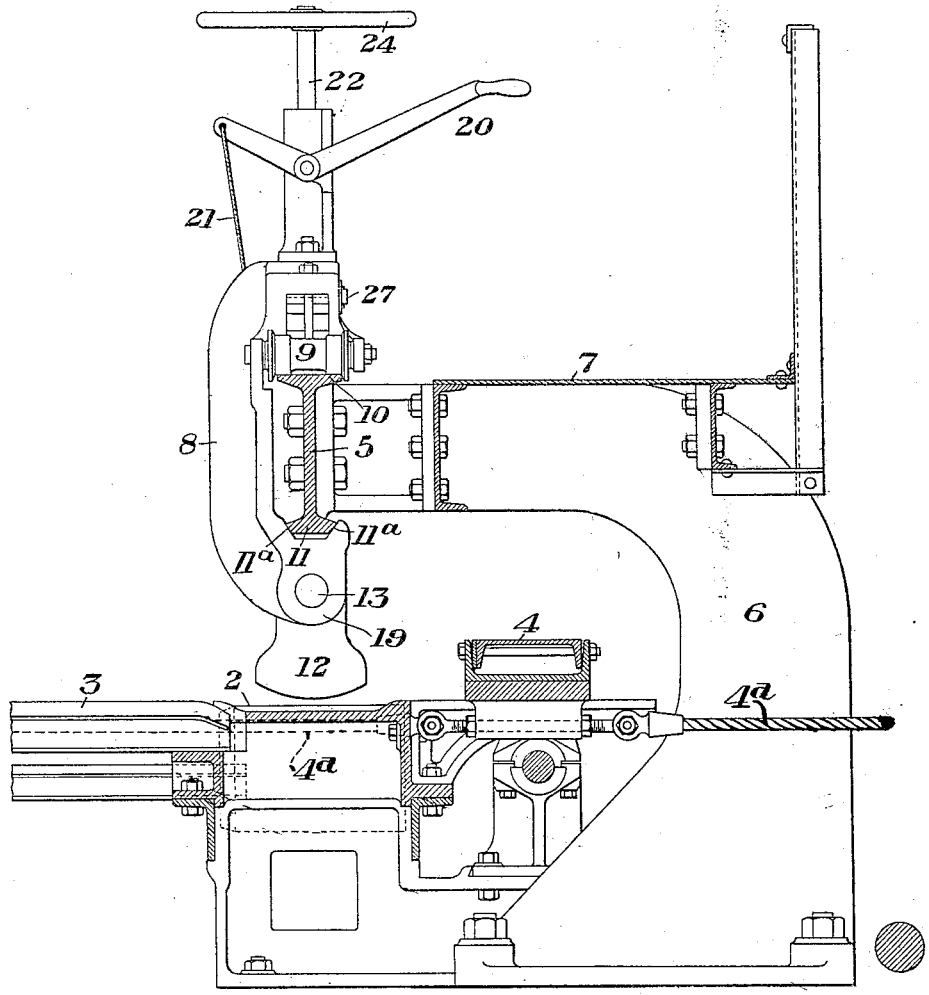

W. AHLEN.
ADJUSTABLE STOP MECHANISM.
APPLICATION FILED JAN. 31, 1908.

999,194.

Patented Aug. 1, 1911.
2 SHEETS—SHEET 1.

WITNESSES

INVENTOR

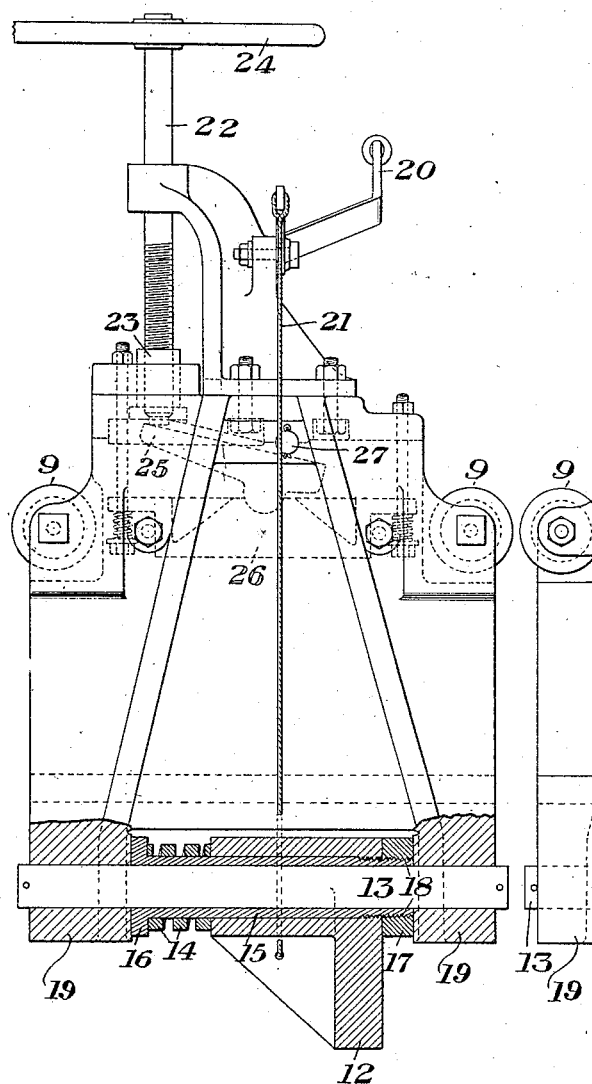
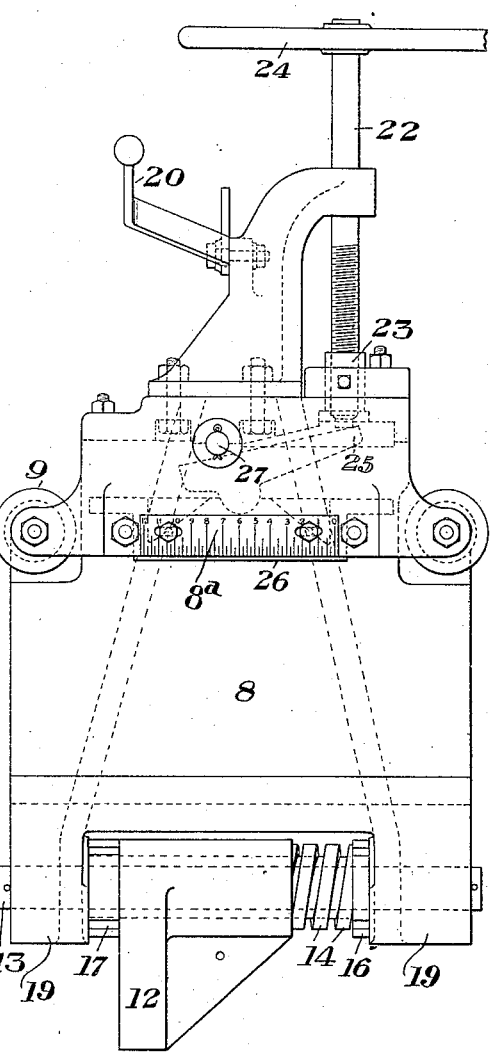

UNITED STATES PATENT OFFICE.

WILLIAM AHLEN, OF DUQUESNE, PENNSYLVANIA.

ADJUSTABLE STOP MECHANISM.

999,194. Specification of Letters Patent. Patented Aug. 1, 1911.

Application filed January 31, 1908. Serial No. 413,559.

*To all whom it may concern:*

Be it known that I, WILLIAM AHLEN, of Duquesne, Allegheny county, Pennsylvania, have invented a new and useful Adjustable Stop Mechanism, of which the following is a full, clear, and exact description, reference being had to the accompanying drawings, forming part of this specification, in which—

Figure 1 is an end elevation partly in section showing my improved stop as it is applied for use above and in line with the rollers of a roller delivery table; Fig. 2 is a front elevation of the stop and Fig. 3 is a rear elevation of the same.

My invention relates to apparatus used in checking the forward movement of rolled steel bars, beams or other materials manufactured in a rolling mill, and the object of the invention is to provide a simple and effective mechanism which is easily and quickly adjusted along the length of the beam forming the runway or track upon which the stop is mounted so as to vary the distance between the saw or shear and the stop so as to regulate the length to which the materials on the feed table are cut.

Another object of the invention is to provide improved means for securing the apparatus in its adjusted position on its track and means whereby the stop is moved out of the path of the pusher by which the materials are moved transversely from the feed table to a storage or cooling bed or other point of delivery and is moved out of the path of materials being fed forwardly on the rollers of the feed table.

A still further object of the invention is to provide improved means for cushioning the impact of the materials when fed forwardly into contact with the stop by the feed table.

In the drawings, 2 represents the rollers of a roller feed table, on which materials are delivered from the rolling mill or other point of supply to the saw or shear into position to be cut, as shown, this table being located above and to one side of a cooling bed or storage bed 3. A pusher 4 is provided by means of which the bars or other materials on the feed rollers 2 are transferred laterally sidewise from the rollers of the feed table to the skids forming the cooling bed or storage bed 3. The pusher 4 is connected by endless ropes or other flexible connections 4ᵃ which extend around winding and rope tightening drums (not shown) located on opposite sides of the bed 5, which construction being old and well known and not forming part of this invention need not be further described.

A longitudinal beam 5 extends parallel with and above the feed table 2, being secured upon the supports or standards 6, and on the top portions of the standards 6 a platform 7 is provided on which the operator is stationed to manipulate the movable stop which is mounted on the beam 5. The stop consists in a frame 8 having anti-friction rollers 9, which are mounted upon and run on the track formed by the top flange 10 of the beam 5, the lower end of the frame 8 extending under and engaging with the lower flange 11 of the beam 5. The opposite edges of the flange 11 are beveled, and the engaging faces of the frame 8 have similarly beveled faces, which contact with the beveled edges of the flange 11, as shown at 11ᵃ.

Pivotally secured on the lower end of the frame 8, is a movable arm or stop 12, this stop being secured to the frame by the pin 13. Also mounted on the pin 13 is a helical spring 14, which is employed to absorb the shock caused by the impact against the stop of the metal being brought into contact with it by the feed table rollers 2. Mounted on the pin 13, is a bushing 15 having a collar 16 formed integral on one end and having a collar 17 on its opposite end which is secured so as to be adjustable on the bushing or sleeve 15 by means of the screw threads 18. The spring 14 is mounted on the bushing 15, the ends of this spring engaging with the collar 16 and the end of the stop 12. By the use of this construction, the tension upon the spring may be adjusted without binding between the oppositely facing bearings 19 for the pin 13 on the lower portion of the frame 8, and this construction allows the stop 12 to freely swing sidewise irrespective of the tension on the spring when this stop is moved by the operator through the hand lever 20, which is connected to the stop 12 by the chain or other flexible connection 21.

Mounted on the top portion of the frame 8 is a shaft 22, which extends downwardly into the screw-threaded nut 23, and is provided on its upper end with the hand wheel 24. The lower end of the shaft 22 engages with the outer end of a lever arm 25, the fulcrum of which bears upon the shoe 26 on the frame of the stop, which shoe slides upon the top flange 10 of the beam 5. The opposite end of the lever 25 engages with the pin 27 on the frame 8, so that as the hand wheel 24 is turned by the operator the frame 8 is raised and is securely locked in its adjusted position on the beam 5, the beveled edges 11ª of the lower flange 11 wedging these parts together so as to securely hold the stop and frame in the desired position.

The top flange 10 of the beam 5 on the edge nearest the platform is marked so as to divide its length into feet so as to indicate the distance in feet from a saw or other cutting tool to the face of the stop 12. On the side of the movable frame 8 is a graduated plate 8ª which is divided into inches and fractional parts of an inch. By adjusting the frame 8 the desired mark on the plate 8ª is moved into place in line with the desired mark on the beam 5 and the operator is enabled to cut the materials to any required fractional part of an inch in length.

In the operation of my improved apparatus, the frame 8 with the stop 12 is moved along the beam 5 by the operator until the stop is in the desired position. The hand wheel 24 is then operated to move the lever 25 and cause the frame 8 to be tightly gripped on the opposite flanges 10 and 11 of the beam 5. The material is then fed into contact with the stop 12 by the feed roller table. The material is then sawed or otherwise cut to the desired length and the pusher 4 is then actuated to move the cut material transversely from the roller table to the cooling bed 3. The stop 12 may be lifted clear of the cut materials by moving it out of the path of the pusher 4 through the hand lever 20 by the operator, or this stop may be moved by contact with the pusher 4, as is desired.

Where the roller delivery table is very long and the differences in the lengths to which the materials are cut are very great, a series of stops may be provided at suitable intervals in the length of the delivery table instead of the one stop shown, and in such case the successive swinging stops can be raised out of the path of the material being fed forwardly on the table until it is in contact with the desired stop.

The advantages of my invention are many, and will be apparent to those skilled in the art. I am the first to bevel the edges of the lower flange of the beam carrying the stop and to provide correspondingly beveled edges on the frame of the stop which by the action of the tightening mechanism operated by the hand wheel 24 wedges the frame of the stop into its adjusted position. I am also the first to show a stop having a spring arranged to resist the impact of the metal brought into contact with it, in which the tension upon the spring can be adjusted without increasing the force necessary to move the swinging stop, and such construction I intend to claim broadly.

I claim—

1. Stop mechanism for metal bars and the like comprising a roller delivery table having a pusher arranged to move across the width of the table, a carriage track directly over the feed rollers and extending lengthwise parallel with the length of said roller table having a carriage movably mounted thereon and a swinging stop depending from said carriage and arranged to swing out of the path of bars being transferred longitudinally on said delivery table.

2. Stop mechanism for metal bars and the like comprising a roller delivery table having a pusher arranged to move across the width of the table, a carriage track directly over the feed rollers and extending lengthwise parallel with the length of said roller table having a carriage removably mounted thereon and a swinging stop depending from said carriage and arranged to swing out of the path of bars being transferred lengthwise by said roller table and means on the carriage for swinging said stop.

3. Stop mechanism for metal bars and the like comprising a roller delivery table, a swinging stop member, a carriage track extending lengthwise above the roller table, a carriage for said stop member movably mounted on said track, said carriage and track having co-acting wedging faces and means for lifting said carriage on the track to bring said wedging faces into locking position.

4. Stop mechanism for metal bars and the like comprising a roller delivery table, a stop member supported so as to swing transversely of the width of said table out of operative position, a cushioning device for the stop and means for varying the resistance of said cushioning device without interfering with the free swinging movement of the stop.

5. Stop mechanism for metal bars and the like having a swinging stop member, an adjustable carriage from which the stop depends, a track on which the carriage is longitudinally adjustable, said track and carriages having engaging wedging faces adapted to secure the carriage on said track and means on the carriage for lifting said carriage to bring the wedging faces into locking position.

6. Stop mechanism for metal bars and the like having a stop member supported to swing out of operative position, a sleeve on which the stop member is mounted, a spring also mounted on the sleeve, means securing the spring and stop member on the sleeve, and arranged to vary the resistance of the spring, and a shaft on which the sleeve is loosely mounted.

7. Stop mechanism for metal bars and the like having a depending stop member thereon, an adjustable carriage on which the stop member is mounted to swing into and out of operative position, a beam on which said carriage is movably mounted, opposing wedging faces on the carriage and flanges of said beam arranged to co-act in locking the carriage on said beam and means arranged to lift the carriage on the beam in bringing said wedging faces into locking engagement.

In testimony whereof, I have hereunto set my hand.

WILLIAM AHLEN.

Witnesses:
GEORGE L. NEFF,
T. E. McDOWELL.

Copies of this patent may be obtained for five cents each, by addressing the "Commissioner of Patents, Washington, D. C."